(12) United States Patent
Lee et al.

(10) Patent No.: US 7,867,413 B2
(45) Date of Patent: Jan. 11, 2011

(54) INK FOR INK JET PRINTING AND METHOD FOR PREPARING METAL NANOPARTICLES USED THEREIN

(75) Inventors: Jong Taik Lee, Daejeon (KR); Soo Yeon Heo, Daejeon (KR); Min Seo Kim, Daejeon (KR); Hyun Sik Kim, Daejeon (KR); Jung Ho Park, Seoul (KR); Sang Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 195 days.

(21) Appl. No.: 11/717,744

(22) Filed: Mar. 14, 2007

(65) Prior Publication Data

US 2008/0078302 A1    Apr. 3, 2008

(30) Foreign Application Priority Data

Sep. 29, 2006    (KR) ............... 10-2006-0096405
Feb. 7, 2007     (KR) ............... 10-2007-0012942

(51) Int. Cl.
 *H01B 1/02*    (2006.01)
 *H01B 1/12*    (2006.01)

(52) U.S. Cl. ............... 252/512; 252/519.33

(58) Field of Classification Search ............... 252/512, 252/519.33

See application file for complete search history.

(56) References Cited

U.S. PATENT DOCUMENTS

| | | | |
|---|---|---|---|
| 6,921,626 B2 * | 7/2005 | Ray et al. | 430/311 |
| 7,407,527 B2 * | 8/2008 | Hyeon | 75/351 |
| 7,691,175 B2 * | 4/2010 | Shimoda et al. | 75/255 |
| 2002/0194958 A1 | 12/2002 | Lee et al. | |
| 2004/0191641 A1 * | 9/2004 | Ray et al. | 430/5 |
| 2005/0127134 A1 * | 6/2005 | Lu et al. | 228/101 |
| 2005/0194577 A1 * | 9/2005 | Kasuga et al. | 252/514 |
| 2005/0238804 A1 | 10/2005 | Garbar et al. | |
| 2006/0094189 A1 | 5/2006 | Zurcher et al. | |

(Continued)

FOREIGN PATENT DOCUMENTS

WO    WO 2006/052042 A1    5/2006

(Continued)

*Primary Examiner*—Mark Kopec
*Assistant Examiner*—Jaison P Thomas
(74) *Attorney, Agent, or Firm*—McKenna Long & Aldridge LLP

(57) ABSTRACT

Disclosed is ink for ink jet printing, which comprises: metal nanoparticles comprising a surfactant attached to surfaces thereof; and a first solvent, wherein the metal nanoparticles are present in an amount of 50~70 parts by weight based on 100 parts by weight of the ink, and the surfactant is present in an amount of 0.5~5 parts by weight based on 100 parts by weight of the metal nanoparticles. Metal nanoparticles used in the ink and a method for preparing the metal nanoparticles are also disclosed. The method for preparing metal nanoparticles for use in ink for ink jet printing comprises a step of washing surplus surfactant with at least one solvent. By doing so, the surplus surfactant remaining on the surfaces of the metal nanoparticles can be minimized, resulting in a drop in viscosity of ink comprising the metal nanoparticles. Therefore, even if the ink has a metal nanoparticle content of 50 wt % or more, the ink can satisfy a viscosity condition required for ink jet printing, and thus can form an electrode pattern with high conductivity.

12 Claims, 2 Drawing Sheets

U.S. PATENT DOCUMENTS

2006/0148932 A1 7/2006 Nohr et al.
2007/0056402 A1* 3/2007 Cho et al. .................... 75/362
2008/0113195 A1* 5/2008 Boll et al. ................... 428/401
2008/0241414 A1* 10/2008 Kim et al. ................... 427/466

FOREIGN PATENT DOCUMENTS

WO    WO 2006/072959    *   7/2006

* cited by examiner

INK FOR INK JET PRINTING AND METHOD FOR PREPARING METAL NANOPARTICLES USED THEREIN

This application claims the benefit of Korean Patent Application Nos. 10-2006-96405 and 10-2007-12942, filed Sep. 29, 2006 and Feb. 7, 2007, respectively in Korea, which are hereby incorporated by reference in their entirety for all purposes as if fully set forth herein.

TECHNICAL FIELD

The present invention relates to ink for ink jet printing and a method for preparing metal nanoparticles used therein. More particularly, the present invention relates to ink for ink jet printing, which comprises a maximized amount of metal nanoparticles by washing surplus surfactant present on surfaces of the metal nanoparticles with at least one solvent in order to minimize the amount of surfactant remaining on the surfaces of the metal nanoparticles.

BACKGROUND ART

Recently, various types of flat panel display devices have come into the spotlight as display devices that can substitute for cathode ray tubes, such flat panel display devices including liquid crystal display (LCD) devices, field emission display (FED) devices, plasma display panel (PDP) devices and electroluminescence (EL) devices.

In a conventional process for fabricating a flat panel display device, a patterning step is generally performed by photolithography. A photolithographic process has a series of photographic processing steps including coating a photoresist, aligning a mask, exposure, development and stripping. Such photolithographic processes are problematic in that they require a long period of processing time, consume a photoresist and a stripping solution for removing a photoresist pattern, and need expensive systems such as an exposure system. Particularly, as a substrate increases in size and a pattern formed on the substrate decreases in size, a more expensive exposure system is required. Moreover, it is difficult to control a pitch precision and electrode width in such processes.

Meanwhile, an ink jet process for forming an electrode has been proposed in view of the realization of a fine line width, low material loss and simple processing steps. Such ink jet patterning processes have come into the spotlight as direct printing processes applicable to various fields in addition to the field of flat panel display devices.

An ink jet process allows direct patterning of a desired pattern on a substrate by using an ink jet head having a plurality of fine nozzles. Thus, an ink jet process includes a decreased number of processing steps, is more cost efficient in equipment investment, and is more flexible to variations in a pattern, as compared to a photolithographic process. Since an ink jet process inherently does not allow the use of high-viscosity paste, it is necessary to use low-viscosity conductive ink including nanometer-scaled fine particles.

To form an electrode pattern via an ink jet printing process, first, metallic ink comprising a solvent, conductive metal particles, a dispersant and additives is jetted from an ink jet nozzle to print a pattern. Then, heat treatment is carried out to remove the solvent and the dispersant and to allow the remaining metal particles to be bound to each other.

Herein, a metallic pattern formed via an ink jet printing process shows higher conductivity as the metal solid content in the ink increases, as the thickness of a printed metal line increases, and as the organic residue remaining after the heat treatment decreases.

Meanwhile, metal nanoparticles may be prepared by a so-called polyol process. In the polyol process, an alcohol compound having a high boiling point is introduced not only as a reducing agent for cations but also as a solvent. For example, it is possible to obtain Ag nanoparticles by reducing a solution of silver nitrate with ethylene glycol at a temperature of 150□, and a surfactant such as PVP (polyvinyl pyrrolidone) may be used to stabilize the surfaces of such reduced Ag nanoparticles. At this time, to facilitate the reaction, the surfactant is generally used in an excessive amount greater than such amount as may be required to stabilize the surfaces of the metal particles.

DISCLOSURE OF THE INVENTION

In the above-mentioned process for preparing metal nanoparticles via a polyol process, the nanoparticles are generally dispersed in the solvent, and the nanoparticles are used in the form of a dispersion or after separating solid particles therefrom, depending on the particular use of the nanoparticles. The dispersion of nanoparticles still contains surplus surfactant, not bound to the nanoparticles, of the surfactant used in an excessive amount in the polyol process. If such surplus surfactant is not removed effectively, it may cause production of high-viscosity ink during the subsequent preparation of ink for ink jet comprising the nanoparticles. Therefore, it may be necessary to reduce the content of the nanoparticles in the ink in order to satisfy the viscosity condition suitable for ink jetting. This may adversely affect the ink jet technology for forming a Well-interconnected electrode pattern.

The inventors of the present invention have found that when preparing metal nanoparticles for use in ink for ink jet printing via a polyol process, washing surplus surfactant remaining on the surfaces of metal nanoparticles and/or in the dispersion with at least one solvent can minimize the amount of the remaining surfactant, can reduce the viscosity of the ink containing the metal nanoparticles and can increase the content of the metal nanoparticles in the ink, and thus can form an electrode pattern with high conductivity. The present invention is based on this finding.

Therefore, the present invention provides ink for ink jet printing, which comprises: metal nanoparticles comprising a surfactant attached to surfaces thereof, and a first solvent, wherein the metal nanoparticles are present in an amount of 50~70 parts by weight based on 100 parts by weight of the ink, and the surfactant is present in an amount of 0.5~5 parts by weight based on 100 parts by weight of the metal nanoparticles.

Also, the present invention provides a method for preparing metal nanoparticles for use in ink for ink jet printing, the method comprising the steps of: (a) adding a surfactant to form metal nanoparticles; and (b) washing surplus surfactant, other than such amount of surfactant as may be attached to surfaces of the metal nanoparticles to stabilize the metal nanoparticles, with at least one kind of second solvent so as to remove the surplus surfactant.

Further, the present invention provides metal nanoparticles for use in ink for ink jet printing, which comprise a surfactant attached to surfaces thereof, wherein the surfactant is present in an amount of 0.5~5 parts by weight based on 100 parts by weight of the metal nanoparticles, as expressed by weight loss in a region of 100° C.~500° C. in TGA analysis.

Hereinafter, the present invention will be explained in more detail.

As used herein, 'a first solvent' means a solvent for the ink, 'a second solvent' means a washing solvent for use in washing off surplus surfactant during the preparation of metal nanoparticles, and 'a third solvent' means a solvent for use in dissolving a metal salt and a surfactant to perform polyol reduction during the preparation of metal nanoparticles.

Due to the method for preparing metal nanoparticles as described in detail hereinafter, the ink for ink jet printing according to the present invention comprises metal nanoparticles that contain a surfactant, attached to the surfaces of the metal nanoparticles so as to stabilize the metal nanoparticles, in an amount controlled to 0.5~5 parts by weight based on 100 parts by weight of the metal nanoparticles, while surplus surfactant is washed off so that the amount of the surfactant remaining in the metal nanoparticles is controlled to 0.5 parts by weight or less based on 100 parts by weight of the metal nanoparticles. Therefore, the ink according to the present invention is characterized by having a metal nanoparticle content increased to a level of 50~70 parts by weight based on 100 parts by weight of the ink, while maintaining a viscosity suitable for ink jet printing. As a result, when a conductive pattern is formed on a substrate by using the ink according to the present invention via an ink jet printing process, it is possible to increase the content of conductive particles, and thus to increase conductivity.

The method for preparing metal nanoparticles used in the ink according to the present invention is characterized by washing surplus surfactant, other than such amount of surfactant as may be attached to the surfaces of the metal nanoparticles to stabilize the metal nanoparticles, with at least one kind of second solvent so as to remove the surplus surfactant.

For example, when preparing metal nanoparticles via a polyol process, a polyol is added as a reducing agent to a solution containing a metal salt, a surfactant and a third solvent. At this time, surplus surfactant, other than such amount of surfactant as may be bound to the metal to function as a dispersant, may remain in the resultant dispersion of metal nanoparticles and the ink comprising the metal nanoparticles, resulting in an increase in viscosity of the ink.

In general, it is difficult to clearly distinguish the surfactant bound to the metal nanoparticles from the surplus surfactant. Although both types of surfactants are substantially the same, presence of a great amount of surplus surfactant not bound to the metal nanoparticles causes an increase in viscosity of ink when preparing the ink by using the metal nanoparticles. This can be determined by TGA analysis, which shows a high proportion of surfactant.

It is a matter of course that the surfactant bound to the metal nanoparticles may also affect the viscosity of ink. However, such amount is the minimum amount essential to stabilize the metal surface. Thus, viscosity adjustment is performed considering such amount when preparing the ink. On the contrary, it is preferred to remove the surplus surfactant remaining undesirably in the ink and causing an increase in viscosity of the ink by the method according to the present invention.

During the removal of the surplus surfactant, the surfactant bound to the surfaces of the metal nanoparticles cannot be removed by a washing step with the second solvent due to the interaction between the metal and the surfactant. Only the surplus surfactant not bound to the metal can be removed during the washing step.

Therefore, according to the method of the present invention that comprises the steps of forming a dispersion of metal nanoparticles, adding at least one kind of second solvent to the dispersion to dissolve surplus surfactant, and separating the metal nanoparticles from the resultant solution, it is possible to obtain nanoparticles, which are free from any surplus surfactant remaining therein and comprise the surfactant attached to the surfaces of the metal nanoparticles for stabilizing the metal nanoparticles in an amount of 0.5~5 parts by weight based on 100 parts by weight of the metal nanoparticles.

Herein, the second solvent used for washing the surplus surfactant may be a solvent that cannot be bound to the metal nanoparticles and is capable of dissolving the surfactant remaining on the surfaces of the metal nanoparticles and in the solution. Selection of the second solvent depends on the particular type of surfactant to be removed. Non-limiting examples of the second solvent include water, methanol, ethanol, propanol, isopropanol, butanol, pentanol, hexanol, dimethyl sulfoxide (DMSO), N,N-dimethylformamide (DMF), N-methylpyrrolidone, acetone, acetonitrile, tetrahydrofuran (THF), decane, nonane, octane, heptane, hexane, pentane, or the like.

Also, depending on the particular type of surfactant to be removed, each of the above solvents may be used alone or in combination. Preferably, a mixed solvent containing at least two kinds of the second solvents may be used in order to efficiently dissolve the surplus surfactant remaining in a gap of agglomerated particles and to allow the surplus surfactant to be separated as a supernatant upon the subsequent centrifugal separation. Additionally, when such a mixed solvent containing at least two kinds of second solvents is used, at least one of the second solvents is preferably a solvent capable of dissolving the surfactant. Another second solvent not capable of dissolving the surfactant may be mixed with the above solvent capable of dissolving the surfactant.

The mixed solvent containing at least two kinds of second solvents may have a different polarity and solubility from those of a single solvent. Preferably, variations in combination of the mixed solvent are made according to the particular type of surfactant used for preparing nanoparticles.

According to the present invention, the second solvent is added in an amount corresponding to 5~20 times of the total weight of the surfactant in the metal nanoparticle dispersion. If the second solvent is used in an amount less than 5 times of the total weight of the surfactant, it is not possible to sufficiently wash off the surplus surfactant. Use of the second solvent in an amount greater than 20 times of the total weight of the surfactant is not cost-efficient due to a great loss of the washing solvent.

After washing the surplus surfactant with at least one kind of second solvent according to the present invention, the surplus surfactant may remain in the resultant nanoparticles or ink using the same in an amount of 0.5 parts by weight or less based on 100 parts by weight of the metal nanoparticles. Additionally, the surfactant bound or attached to the surfaces of the metal nanoparticles, which is not removed by the above washing step but serves to stabilize the metal nanoparticles, may be present in an amount of 0.5~5 parts by weight based on 100 parts by weight of the metal nanoparticles.

The amount of the surfactant may be determined by qualitative or quantitative analysis. In other words, presence of a surfactant may be determined from a photograph of the metal nanoparticles taken by a transmission electron microscope (TEM) that shows the nanoparticles surrounded with the surfactant. The amount of the remaining surfactant can be determined from thermogravimetric analysis (TGA). For example, in the graph as shown in FIG. 1, it can be seen that the first solvent completely evaporates at about 150° C. and all organic substances are burnt out at about 500° C. Thus, the difference between the weight at 150° C. and the weight at 500° C. can be regarded as the amount of surfactant. Each solvent has a different temperature where it evaporates completely. Therefore, the weight loss as measured by TGA in a region from the complete evaporation temperature of the first solvent to 500° C. can be regarded as the organic content, i.e. the amount of surfactant. The complete evaporation temperature of the first solvent depends on the particular kind of the solvent but generally ranges from 100° C. to 200° C.

When the above washing step is not performed sufficiently during the preparation of nanoparticles according to the present invention, the organic content as measured by TGA may be more than 5 parts by weight based on 100 parts by weight of the metal nanoparticles. Considering the amount of the surfactant attached to the surfaces of the metal nanoparticles, which ranges from 0.5 to 5 parts by weight based on 100 parts by weight of the metal nanoparticles, it can be seen that a significant amount of surfactant remains. When the above washing step is performed to a sufficient degree, the surplus surfactant is totally removed, and the organic content as measured by TGA may range from 0.5 to 5 parts by weight based on 100 parts by weight of the metal nanoparticles.

Meanwhile, even though the washing step is performed sufficiently, 0.5 parts by weight or less of surplus surfactant, based on 100 parts by weight of the metal nanoparticles, still remains in the metal nanoparticles and/or ink. Such a small amount is not detected easily by instrumental analysis. Additionally, even if such surplus surfactant remains, it does not significantly affect the viscosity and other physical properties of the ink, and thus may be acceptable after the washing step.

The surfactant may be one used for preparing metal nanoparticles. There is no particular limitation in the surfactant, as long as the surfactant can stabilize the surfaces of the metal nanoparticles. When a metal salt is reduced in a solution to form metal nanoparticles, the metal nanoparticles are in an unstable state with high surface energy because of a high specific surface area of the metal nanoparticles. To reduce such surface energy, the metal nanoparticles tend to form aggregates with each other. Such aggregation of the nanoparticles can be prevented by using a surfactant attached to the surfaces of the metal nanoparticles to surround the metal nanoparticles. Additionally, the surfactant serves to prevent oxidation of the metal particles and to maintain the metal nanoparticles in a stable state.

A surfactant is a substance adsorbed to an interface in a solution to reduce surface tension. Generally, a surfactant includes an amphiphilic substance having a hydrophilic group simultaneously with an oleophilic group in one molecule. Surfactants are classified into anionic surfactants, cationic surfactants, amphoteric surfactants, non-ionic surfactants, etc., according to ionization characteristics. Non-limiting examples of the surfactant to be removed according to the present invention include polyvinyl pyrrolidone (PVP), polyethylene imine (PEI), polymethyl vinyl ether (PMVE), polyvinyl alcohol (PVA), polyoxyethylene alkyl phenyl ether, polyethylene sorbitan monostearate, or the like. Derivatives of these surfactants may also be included in the scope of the present invention. The above surfactants may be used alone or in combination.

The metal nanoparticles obtained according to the present invention are for use in forming an electrode pattern on a substrate such as a display substrate, and can be subjected to patterning via an ink jet printing process. There is no particular limitation in the nanoparticles, as long as they have high conductivity. Non-limiting examples of the metal nanoparticles include Ag, Cu, Au, Cr, Al, W, Zn, Ni, Fe, Pt, Pb or alloys thereof.

The method for preparing metal nanoparticles according to the present invention may comprise a step of washing surplus surfactant with at least one kind of second solvent to remove the surplus surfactant. Therefore, there is no particular limitation in the method for preparing metal nanoparticles, with the exception of the above washing step, as long as the method utilizes an excessive amount of surfactant higher than such amount as may be attached to the metal nanoparticles, and thus has a possibility that surplus surfactant still remains in the resultant dispersion of metal nanoparticles. In other words, the method for preparing metal nanoparticles according to the present invention comprises the steps of:
 (a) adding a surfactant to form metal nanoparticles; and
 (b) washing surplus surfactant, other than such amount of surfactant as may be attached to the metal nanoparticles to stabilize the metal nanoparticles, with at least one kind of second solvent so as to remove the surplus surfactant.

In step (a) for forming the metal nanoparticles, the metal nanoparticles are in an unstable state with high surface energy due to their large specific surface area. To reduce such high surface energy, the metal nanoparticles tend to aggregate with each other. Herein, the surfactant is added to be attached to the surfaces of the nanoparticles so that the surfaces are surrounded with the surfactant. By doing so, such aggregation of the nanoparticles can be prevented. Further, the surfactant prevents oxidation of the metal particles so that the metal nanoparticles can be maintained in a stable state. It is to be noted that although the surfactant may be used in such amount as may be attached to the metal nanoparticles, the surfactant is preferably used in an excessive amount greater than such amount in order to facilitate progress of the reaction.

Preferably, the metal nanoparticles may be prepared via a polyol process wherein a polyol is used not only as a reducing agent but also as a third solvent. In one embodiment of the polyol process, step (a) of the method according to the present invention can be performed by adding a polyol as a reducing agent to a solution containing a metal salt, an excessive amount of surfactant and a third solvent to form metal nanoparticles containing the surfactant attached to the surfaces thereof. At this time, the metal nanoparticles may be present in a dispersion in which the metal nanoparticles are dispersed in solvent. Step (a) is a so-called polyol process wherein metal nanoparticles are obtained via reduction of a metal salt. In step (a), the polyol serves not only as a reducing agent but also as the solvent. Non-limiting examples of the polyol include ethylene glycol, tri(ethylene glycol), tetra(ethylene glycol), etc.

There is no particular limitation in the third solvent, as long as it is a solvent currently used for the reduction of a metal salt. Non-limiting examples of the third solvent include water, methanol, ethanol, propanol, isopropanol, butanol, pentanol, hexanol, DMSO, DMF, ethylene glycol, ethylene glycol monomethyl ether, ethylene glycol monoethyl ether, ethylene glycol dimethyl ether, ethylene glycol diethyl ether, propylene glycol, propylene glycol propyl ether, propylene glycol methyl ether acetate, N-methylpyrrolidone, methyl isobutyl ketone, methyl ethyl ketone, acetonitrile, THF, hexadecane, pentadecane, tetradecane, tridecane, dodecane, undecane, decane, nonane, octane, heptane, hexane, xylene, toluene, benzene, or the like. The above solvents may be used alone or in combination.

The metal salt that may be used in the present invention is a metal salt known to form a metal via reduction. Any metal salt can be used with no particular limitation and non-limiting examples thereof include nitrate ($NO_3^-$), halides ($Cl^-$, $Br^-$, $I^-$), oxyhydrate ($OH^-$), sulfate ($SO_4^{2-}$), acetate ($C_2H_3O_2^-$), or the like.

Step (a) may be performed at a temperature of 150° C.~300° C. Generally, during a polyol process, formation of nanoparticles via the reduction of a metal salt occurs sufficiently at a temperature near the boiling point of the polyol used in the process. In view of this, such a range of temperatures is preferred.

As described above, in step (b), at least one kind of second solvent is added to dissolve the surplus surfactant remaining on the surfaces of the metal nanoparticles and/or in the dispersion, so that the surfactant is washed off from the metal nanoparticles.

To wash off the surplus surfactant with the second solvent, the second solvent is mixed uniformly with the dispersion of metal nanoparticles, thereby dissolving the surplus surfactant, as described above. Then, a liquid phase may be removed by means of a solid-liquid separation method known to those skilled in the art, such as a centrifugal separation method. Although step (b) of washing off the surplus surfactant may be performed only once, such washing may be performed several times according to a degree of removal of the surplus surfactant. In other words, the metal nanoparticles separated from the solvent are dispersed back into the third solvent to provide a dispersion of metal nanoparticles, followed by repeating step (b). However, when the surplus surfactant is removed by using the second solvent according to the present invention, it is possible to obtain an excellent washing effect, and thus to remove the surplus surfactant sufficiently by repeating the washing several times, preferably once to five times, not by repeating the washing many times.

Meanwhile, the surfactant attached to the particles is bound to the particles under a binding force, so that it cannot be separated from the particles by the above step of washing off the surplus surfactant. The washing step removes only the surplus surfactant.

According to the present invention, it is possible to select an adequate second solvent depending on the particular kind of the surfactant used in a process for preparing the metal nanoparticles, such second solvent being capable of dissolving the surfactant. Also, it is possible to obtain metal nanoparticles free from any surplus surfactant remaining therein by controlling the ratio of the amount of the second solvent to that of the surfactant.

In the ink for ink jet printing that comprises the metal nanoparticles dispersed therein, the surplus surfactant is removed sufficiently by the above washing step, so that the ink has a low viscosity sufficient to be used for ink jet printing. Thus, it is possible to provide ink for ink jet printing, which comprises the metal nanoparticles in an amount of 50~70 parts by weight per 100 parts by weight of the ink on the solid content basis. A higher solid content of the metal nanoparticles in the ink is more preferred. However, considering the viscosity suitable for ink jetting, the above range of viscosity is preferred.

Meanwhile, the ink for ink jet printing according to the present invention has a viscosity suitable for ink jetting as described above, and preferably has a viscosity of 1~50 cPs. If the ink has a viscosity outside of the above range, there may be problems related to the stability of the ink itself and ink jetting quality. Additionally, the ink for ink jet printing according to the present invention preferably has physical properties suitable for ink jetting, including a surface tension of 20~40 mN/m.

The ink for ink jet printing according to the present invention is characterized by comprising the metal nanoparticles obtained from the method as described above, which comprises a step of washing surplus surfactant remaining on the surfaces of the metal nanoparticles with at least one kind of second solvent so as to remove the surplus surfactant.

The ink for ink jet printing according to the present invention may be obtained by dispersing the metal nanoparticles into the first solvent, and by adding a dispersant and other additives thereto.

Both the surfactant used for preparing the metal nanoparticles and the dispersant added to the ink serve to stabilize the surfaces of the particles and to prevent aggregation of the particles. Thus, the dispersant added separately to the ink may also affect the viscosity of the ink. In general, a dispersant is added in a small amount as necessary, because it has a relatively high viscosity.

Herein, the first solvent may be a solvent currently used for preparing ink. Non-limiting examples of the first solvent include water, acetone, methyl ethyl ketone, methyl isobutyl ketone, methyl cellosolve, ethyl cellosolve, tetrahydrofuran, 1,4-dioxane, ethylene glycol dimethyl ether, ethylene glycol diethyl ether, propylene glycol methyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloro ethene, hexane, heptane, octane, cyclohexane, benzene, toluene, xylene, methanol, ethanol, isopropanol, propanol, butanol, t-butanol, cyclohexanone, propylene glycol methyl ether acetate, propylene glycol ethyl ether acetate, 2-methoxybutyl acetate, ethyl 3-ethoxypropionate, ethyl cellosolve acetate, methyl cellosolve acetate, butyl acetate, methyl ethyl ketone, methyl isobutyl ketone, ethylene glycol monomethyl ether, γ-butyrolactone, N-methylpyrrolidone, dimethyl formamide, tetramethyl sulfone, ethylene glycol acetate, ethyl ether acetate, ethyl lactate, polyethylene glycol, cyclohexanone, or the like.

The dispersant serves to prevent aggregation of the metal particles by stabilizing the surfaces of the metal particles. Non-limiting examples of the dispersant include BYK-080A, BYK-110, BYK-130, BYK-174, BYK-180, BYK-183, BYK-185, BYK-330, BYK-337, BYK-2000, BYK-2001, Tego 425, Tego 735w, Tego 750w, or the like.

The ink according to the present invention may further comprise a curing initiator, a curing accelerator and a colorant. The curing initiator or accelerator may be water soluble or dissolved by an emulsifier.

BRIEF DESCRIPTION OF THE DRAWINGS

The foregoing and other objects, features and advantages of the present invention will become more apparent from the following detailed description when taken in conjunction with the accompanying drawings in which:

FIG. 3 1 is a graph that shows the results of TGA (Thermogravimetric Analysis) of the ink for ink jet printing according to Comparative Example 1.

MODE FOR CARRYING OUT THE INVENTION

Reference will now be made in detail to the preferred embodiments of the present invention. However, the following examples and comparative examples are illustrative only, and the scope of the present invention is not limited thereto.

EXAMPLE 1

A solution of $AgNO_3$ in ethylene glycol and a solution of PVP (polyvinyl pyrrolidone), a surfactant, in ethylene glycol were provided, and both solutions were mixed and agitated under reflux for about 1 hour at 150° C. to allow them to react. After the reaction, a dispersion containing Ag nanoparticles with a size of 70~150 nm dispersed therein was obtained.

To 10 ml of the solution of Ag nanoparticles obtained by the above-described polyol process, 20 ml of acetone and 10 ml of THF were added. The resultant mixture was subjected to centrifugal separation (5000 rpm, 20 minutes) and the supernatant was removed. Next, the precipitate was dispersed again into 5 ml of ethanol. Then, 10 ml of acetone and 10 ml of THF were added thereto, and the resultant mixture was subjected to centrifugal separation, followed by removing the supernatant. The above procedure was repeated twice, and then the resultant precipitate was dispersed into a solvent (such as ethanol) to provide ink.

Figure 1:
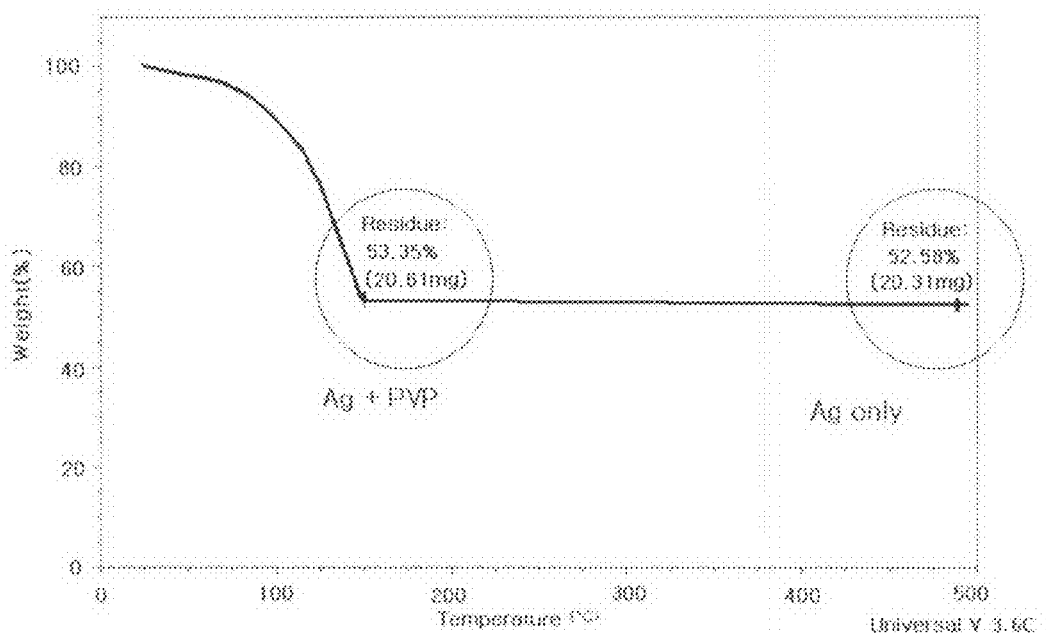
FIG. 1 is a graph that shows the results of TGA (Thermogavimetric Analysis) of the ink for ink jet printing according to Example 1.
Figure 2:
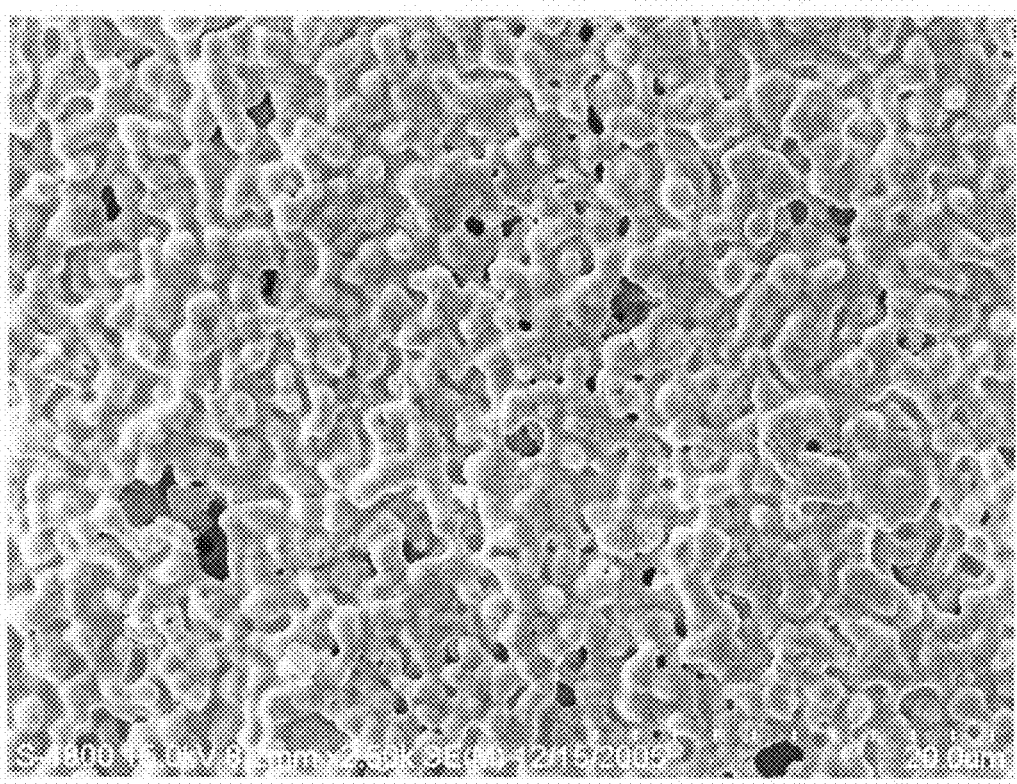
FIG. 2 is a photographic view taken by SEM (Scanning Electron Microscopy), which shows the ink for ink jet printing according to Example 1 after sintering it.

The ink had a solid content of 52.58 wt % and a viscosity of 14.5 cps. After measuring by TGA, the amount of the remaining surfactant was 1.5 parts by weight based on 100 parts by weight of Ag solid particles (see FIG. 1. The values shown in FIG. 1 are based on the total weight of the ink whose Ag solid content is 52.58 wt %). Additionally, the ink was subjected to ink jetting five times so that it was applied onto a substrate, and the ink was sintered at 580° C. for 30 minutes. After the sintering, a pattern having a line width of 117 µm, a thickness of 3.474 µm and a line length of 4.3 cm was obtained, and the pattern showed a line resistance of 2.698Ω and a specific resistivity of 2.550 µΩ.cm. FIG. 2 was a photograph of the pattern taken by SEM after the sintering. As can be seen from FIG. 2, Ag particles are interconnected with each other to provide excellent conductivity.

EXAMPLE 2

Ag nanoparticles were prepared in the same manner as described in Example 1. Next, ink was provided in the same manner as described in Example 1, except that the ink had a solid content of 70 wt %, and then the ink was subjected to an ink jet patterning test.

The ink had a viscosity of 30.5 cps. The ink was applied onto a substrate by subjecting it to ink jetting once and was sintered at 400° C. for 30 minutes. After the sintering, a pattern having a line width of 90 µm, a thickness of 0.68 µm and a line length of 2.1 cm was obtained, and the pattern showed a line resistance of 16.3Ω and a specific resistivity of 4.75 µΩ.cm. Further, the ink was applied onto a substrate by subjecting it to ink jetting once and was sintered at 580° C. for 30 minutes. After the sintering, a pattern having a line width of 44.7 µm, a thickness of 1.2 µm and a line length of 1.5 cm was obtained, and the pattern showed a line resistance of 12Ω and a specific resistivity of 4.29 µΩ.cm.

COMPARATIVE EXAMPLE 1

Nanoparticles, ink and an electrode pattern were obtained in the same manner as described in Example 1, except that surplus surfactant remaining in the solution of Ag nanoparticles was not sufficiently washed off.

Figure 3:
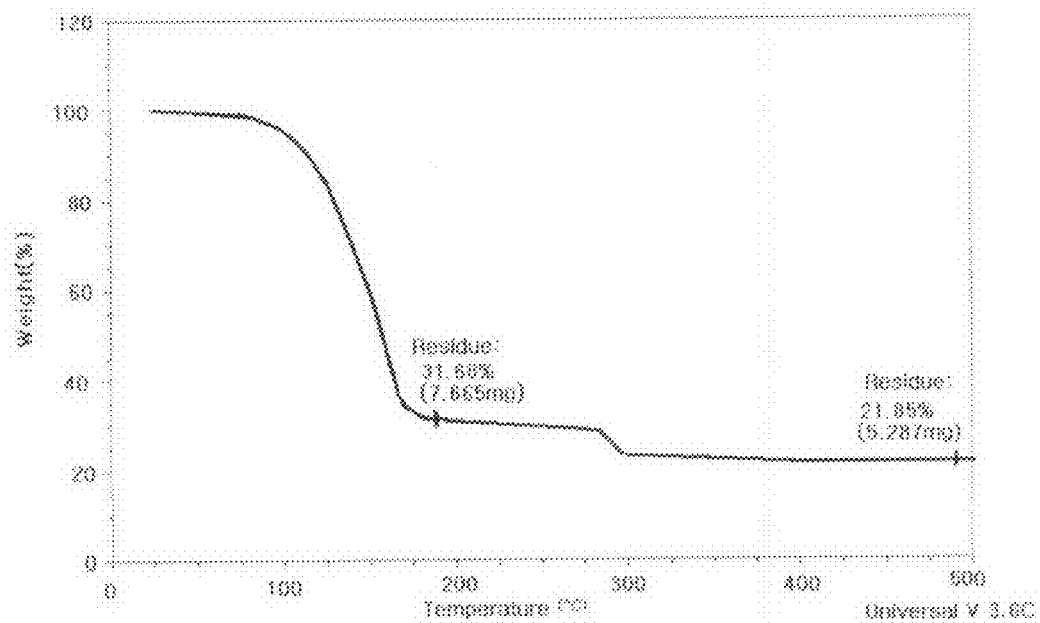

Since the solution had a high viscosity due to the absence of a step of washing the surplus surfactant, the solid content was reduced to ensure an adequate viscosity. for ink jetting. Finally, the solution had a solid content of 21.85 wt % and a viscosity of 16.5 cps. After measuring by TGA, the amount of the surfactant remaining in the solution was 45.0 parts by weight based on 100 parts by weight of the Ag solid particles (see FIG. 3).

Figure 4:
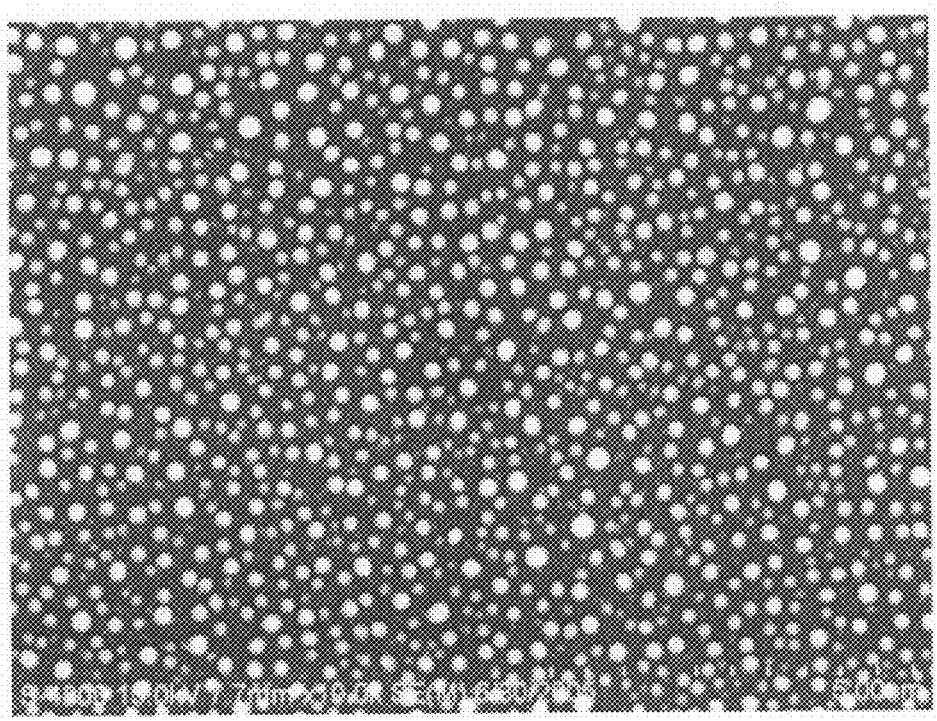
FIG. 4 is a photographic view taken by SEM (Scanning Electron Microscopy), which shows the ink for ink jet printing according to Comparative Example 1 after sintering it.

After sintering, the resultant pattern had a line width of 134 µm, a thickness of 2.297 µm and a line length of 4.3 cm, and its resistance was not available. FIG. 4 is a photograph of the pattern taken by SEM after the sintering. As can be seen from FIG. 4, Ag particles are not interconnected with each other but are separated from each other, thereby making it difficult to allow electrical conduction.

COMPARATIVE EXAMPLE 2

Ink was provided in the same manner as described in Comparative Example 1, except that the ink had a solid content increased to 50 wt %. In this example, the ink had a viscosity of 100 cPs or higher, which could not be measured by using a viscosimeter provided by the inventors of the present invention. Due to such a high viscosity, ink jetting was not allowed either.

INDUSTRIAL APPLICABILITY

As can be seen from the foregoing, the method for preparing metal nanoparticles for use in ink for ink jet printing comprises a step of washing surplus surfactant with at least one solvent. By doing so, the surplus surfactant remaining on the surfaces of the metal nanoparticles can be minimized, resulting in a drop in viscosity of ink comprising the metal nanoparticles. Therefore, even if the ink has a metal nanoparticle content of 50 wt % or more, the ink can satisfy a viscosity condition required for ink jet printing, and thus can form an electrode pattern with high conductivity.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. Ink for ink jet printing, which comprises:
   metal nanoparticles comprising a surfactant attached to surfaces thereof and having a size of 70~150 nm; and
   a first solvent,
   wherein the metal nanoparticles are prepared by adding the surfactant to a metal salt and are present in an amount of 50~70 parts by weight based on 100 parts by weight of the ink,
   the metal salt is reduced to form the metal nanoparticles,
   the surfactant is washed by a second solvent to remove surplus surfactant and is subsequently present in an amount of 0.5~5 parts by weight based on 100 parts by weight of the metal nanoparticles, and
   the ink has a viscosity of 1~50 Cps.

2. The ink according to claim 1, wherein the surfactant is one used for preparing the metal nanoparticles.

3. The ink according to claim 1, wherein the amount of the surfactant can be expressed by a weight loss in a region ranging from complete evaporation temperature of the first solvent to 500° C. as measured by TGA (Thermogravimetric Analysis).

4. The ink according to claim 3, wherein the complete evaporation temperature of the first solvent ranges from 100° C. to 200° C.

5. The ink according to claim 1, which comprises surplus surfactant, not attached to the surfaces of the metal nanoparticles, in an amount of 0.5 parts by weight or less based on 100 parts by weight of the metal nanoparticles.

6. The ink according to claim 1, wherein the metal nanoparticles are at least one type of particle selected from the group consisting of Ag, Cu, Au, Cr, Al, W, Zn, Ni, Fe, Pt and Pb.

7. The ink according to claim 1, wherein the surfactant is a polymeric substance selected from the group consisting of polyvinyl pyrrolidone (PVP), polyethylene imine (PEI), polymethyl vinyl ether (PMVE), polyvinyl alcohol (PVA), polyoxyethylene alkyl phenyl ether and polyethylene sorbitan monostearate.

8. A method for preparing metal nanoparticles for use in ink for ink jet printing, the method comprising the steps of:
(a) adding a surfactant to a metal salt, the metal salt being reduced to form metal nanoparticles; and
(b) washing surplus surfactant, other than such amount of surfactant as may be attached to surfaces of the metal nanoparticles to stabilize the metal nanoparticles, by a second solvent so as to remove the surplus surfactant,
wherein the surfactant, after the washing step, is present in an amount of 0.5~5 parts by weight based on 100 parts by weight of the metal nanoparticles; and
wherein the metal nanoparticles have a size of 70~150 mn.

9. The method for preparing metal nanoparticles for use in ink for ink jet printing according to claim 8, wherein the second solvent is capable of dissolving the surfactant.

10. The method for preparing metal nanoparticles for use in ink for ink jet printing according to claim 8, wherein the second solvent is selected from the group consisting of water, methanol, ethanol, propanol, isopropanol, butanol, pentanol, hexanol, DMSO (dimethyl sulfoxide), DMF (N,N-dimethylformamide), N-methylpyrrolidone, acetone, acetonitrile, THF (tetrahydro furan), decane, nonane, octane, heptane, hexane and pentane.

11. The method for preparing metal nanoparticles for use in ink for ink jet printing according to claim 8, wherein the second solvent is added in an amount corresponding to 5~20 times of the total weight of the surfactant.

12. The method for preparing metal nanoparticles for use in ink for ink jet printing according to claim 8, wherein step (a) is performed by adding a polyol functioning as a reducing agent to a solution containing the metal salt, the surfactant and a third solvent, so as to form metal nanoparticles comprising the surfactant attached to surfaces thereof.

* * * * *